United States Patent [19]

Manning et al.

[11] 4,175,449
[45] Nov. 27, 1979

[54] TILT CAB STEERING COLUMN

[75] Inventors: Walter Manning, Little Baddow; Terry G. Bradley, Chelmsford, both of England

[73] Assignee: Ford Motor Company, Dearborn, Mich.

[21] Appl. No.: 847,985

[22] Filed: Nov. 2, 1977

[30] Foreign Application Priority Data

Feb. 9, 1977 [GB] United Kingdom ................ 5272/77
Feb. 9, 1977 [GB] United Kingdom ................ 5273/77

[51] Int. Cl.² .............................................. B62D 1/18
[52] U.S. Cl. ........................................ 74/492; 64/23; 180/77 TC; 180/89.14; 403/109
[58] Field of Search ............ 74/492, 493; 180/77 TC, 180/89.14, 89.15; 64/23; 403/104, 109

[56] References Cited

U.S. PATENT DOCUMENTS

| 2,761,299 | 9/1956 | Huddle ................... 64/23 |
| 2,873,979 | 2/1959 | Venditty et al. ............. 180/89.14 X |
| 2,937,881 | 5/1960 | Norrie ......................... 180/89.14 X |
| 3,473,406 | 10/1969 | Runkle ....................... 64/23 X |

*Primary Examiner*—Allan D. Herrmann
*Attorney, Agent, or Firm*—John J. Roethel; Keith L. Zerschling

[57] ABSTRACT

A steering column assembly comprising an elongate upper column member for connection with a steering wheel and an elongate lower column member for connection with a steering box. One member is telescopically received within the other for sliding movement between operative and inoperative positions. The outer member has a first length of its internal surface adjacent the received end of the inner member when in said operative position that is dimensioned to fit closely on the inner member. The outer member has a second length extending from its first length toward its receiving end which is of greater internal dimension than said first length to provide a clearance.

7 Claims, 4 Drawing Figures

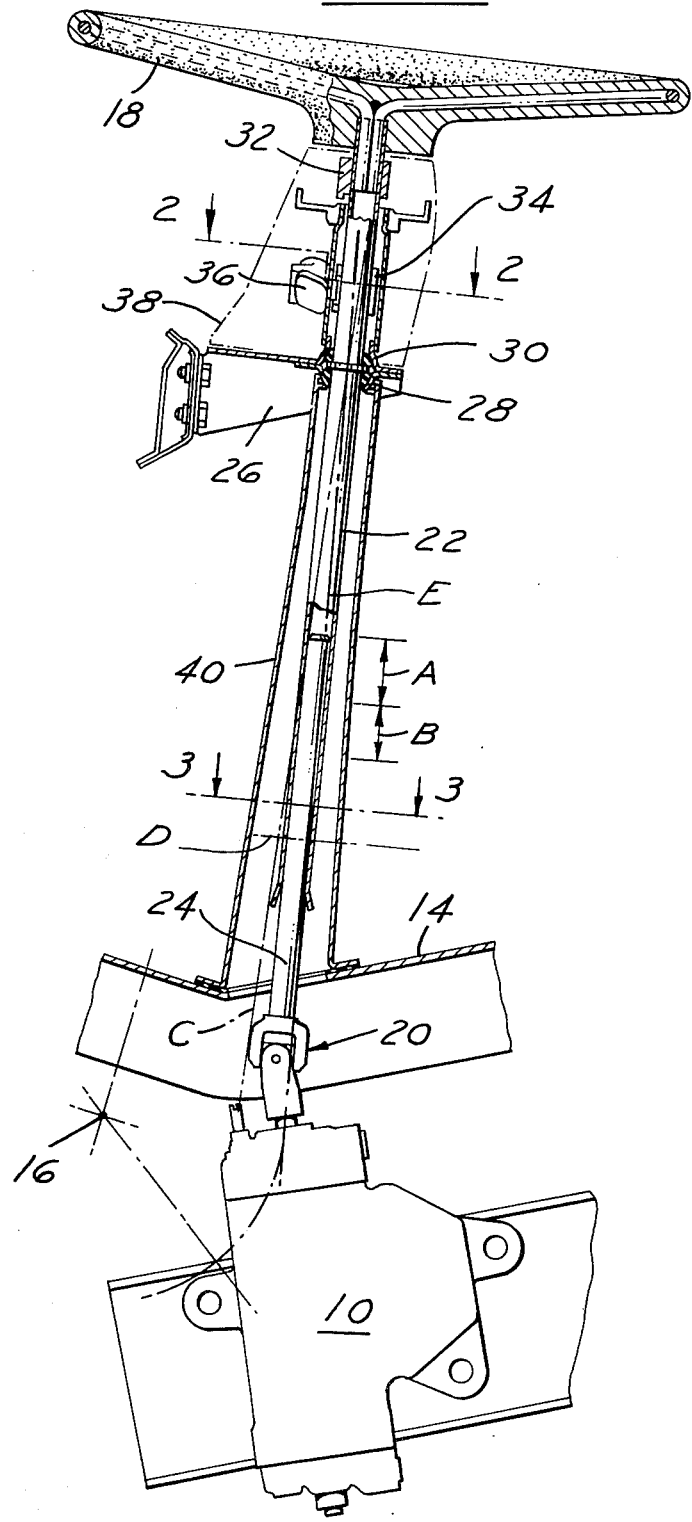

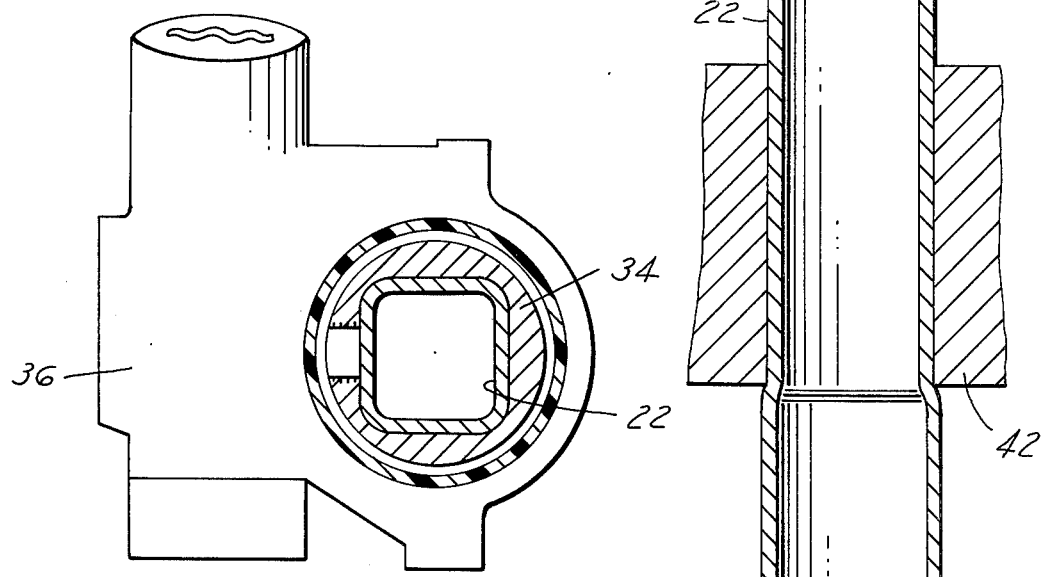
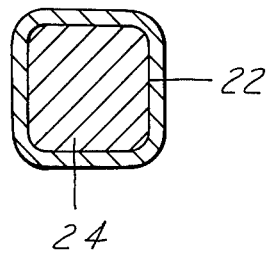
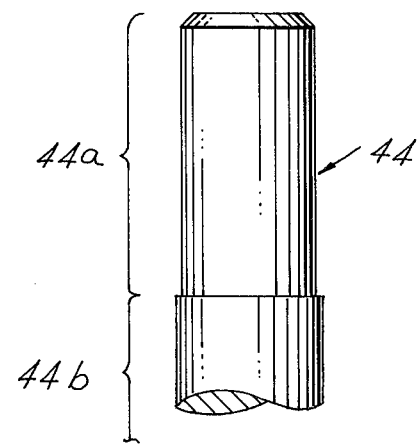

TILT CAB STEERING COLUMN

BACKGROUND OF THE INVENTION

This invention relates to a steering column assembly suitable for use in tilt-cab trucks.

In a tilt-cab truck, the steering box is fixed to the chassis on which the cab is pivoted, while the steering wheel is fixed in relation to the cab. A universal joint is therefore provided between the steering wheel and the steering box. However, unless this joint lies on the cab tilt axis, and such an arrangement can be difficult to realize in practice, a further degree of relative movement is necessary. Also, where the cab is resiliently mounted to the truck frame, it is necessary to accommodate relative movement of the steering wheel and steering box.

It has previously been proposed to use a two-part telescopic steering column for these purposes. In such known constructions, however, the two parts are provided with accurately mating surfaces over a considerable length sufficient to maintain accurate engagement over their entire travel. This involves difficulty and expense in manufacture.

SUMMARY OF THE INVENTION

The invention provides a steering column assembly comprising an elongate upper column member for connection with a steering wheel and an elongate lower column member for connection with a steering box. One member is telescopically received within the other for sliding movement between an operative and an inoperative position. When in the operative position, the outer member has a first length of its internal surface adjacent the received end of the inner member that is dimensioned to fit closely on the inner member. The outer member has a second length extending from its first length towards its receiving end which is of greater internal dimension than said first length to provide a clearance.

DESCRIPTION OF THE DRAWINGS

An embodiment of the invention will now be described, by way of example, with reference to the accompanying drawings, in which:

FIG. 1 is a side elevation, principally in cross-section, of a steering arrangement embodying the invention in a tilt cab;

FIGS. 2 and 3 are cross-sections on the lines 2—2 and 3—3 respectively of FIG. 1; and FIG. 4 illustrates a step in the manufacture of the embodiment.

DETAILED DESCRIPTION OF THE INVENTION

A steering box 10 is secured to a chassis member 12 of a truck. A cab, the floor of which is seen at 14, is mounted on the chassis to tilt about a pivot axis 16. A steering wheel 18 is drivingly connected by a steering column assembly to be described and by a universal joint 20 to the steering box 10. FIG. 1 shows these elements in the normal position of the cab.

The steering column assembly comprises an upper member formed by a tube 22 of generally square cross-section, and a lower member formed by a rod 24 of complementary section, telescopically received within the tube 22. The tube 22 is secured at its upper end to the steering wheel 18; the manner of securing these as seen in FIG. 1 is described in detail in our co-pending application Ser. No. 847,984 filed Nov. 2, 1977. A bracket 26 secured to the cab body provides a part-spherical seat 28 in which is received a part-spherical plastics body 30 which acts as a bearing for the tube 22 and accommodates not only rotation but also limited tilting movement. The tube 22 also carries a direction indicator cam 32 and a steering lock casting 34 for receiving the latch of a steering lock 36. A shroud 38 carried by the bracket 26 covers the upper part of the assembly while the lower part is housed within a flared casing 40 fixed to the floor 14.

A length A of the tube 22 is formed to have a precisely dimensional internal surface exactly interfitting with the rod 24, and the top section of the rod 24 which is received in the length A in normal use, as seen in FIG. 1, is coated with a low friction material, preferably a polytetrafluoroethylene compound of which Dupont's Teflon is an example. Below this, a length B of the tube is opened out to give a maximum clearance of 0.5 mm. In this way, the use of relatively expensive tube having an accurately-sized interior surface over the whole of its length is avoided, while still giving good coupling for steering.

The lengths A and B are suitably formed as shown in FIG. 4. The tube 22 is initially slightly under-size. The section which is to form the length A is positioned in a die 42 and a punch 44 is driven into the tube 22. The punch 44 has a first portion 44a whose surface conforms to the desired configuration of the length A, and a larger portion 44b for forming the length B.

If necessary, the rod 24 may be machined accurately to size on only the corresponding length.

In FIG. 1, the coupled rod 24 and tube 24 are shown as they appear when the truck cab is latched in its normal operating position. When the cab is unlatched and tilted forwardly, the common axis of the coupled rod 24 and tube 22 forming the steering shaft moves within the steering column housing 40 mounted on the cab floor 14 to a position approximated by the line C because of the offset relationship of the cab hinge axis 16 and the pivot axis of the universal joint 20. This also causes protraction of the rod 24 from the tube 22. The permitted protraction in the fully forward tilted position of the cab is indicated by the line D. As the cab is tilted from its forwardly tilted position back toward its normal operating position, there may be a slight overtravel resulting in the common axis of the rod 24 and tube 22 approximately the position of the line E. The lines C and E, therefore, indicate the permitted range of movement of the steering shaft, the rod 24 and tube 22, within the housing 40 during the tilting movement of the cab. Upon the cab being restored to an upright and latched position, the coupled rod 24 and tube 22 re-assume the FIG. 1 position.

In assembly of the vehicle, the tube 22 with steering wheel 18 attached is assembled with the direction indicator cam 32, the steering lock casting 34, and the bracket 26 and bearing body 30. This assembly is then positioned with the tube 22 received on the rod 24, and the bracket 26 is bolted to the cab body.

The upper member may be a rod and the lower a cooperating tube, or both may be formed by tubes. Sections other than square may be used and a driving connection may be ensured by means other than the cross-section of the members, e.g. interfitting pins and slots.

What we claim is:

1. A steering column assembly comprising an elongate upper column member for connecting with a steering wheel and an elongate lower column member for connection with a steering box, the steering wheel being secured directly to the upper column member, the lower column member being telescopically received within the upper column member for sliding movement between an operative and an inoperative position, the upper column member having a first length of its internal surface adjacent the received end of the lower column member, when in said operative position, dimensioned to fit closely on the inner member and a second length extending from its first length toward its receiving end diverging to provide a clearance, the portion of the lower column member which lies, in said operative position, within said first length of the upper column member being coated with a low friction polytetrafluoroethylene material, the upper and lower column members being of non-circular cross section, the upper column member comprises a tube and the lower column member a rod, and bearing means supporting the members for rotation about their longitudinal axis and for limited tilting of said axis.

2. An assembly according to claim 1, in which said bearing means comprises a bracket adapted to be secured to a vehicle body and providing a part-spherical seat encompassing the upper column member, and a part-spherical body of plastics material secured to the upper column member and received in the seat.

3. A steering column assembly comprising an elongate upper column member for connection with a steering wheel and an elongate lower column member for connection with a steering box, one of the column members telescopically receiving the other of the column members for sliding movement therein between an operative and an inoperative position, the one column member having a first length of its internal surface adjacent the received end of the other column member when in said operative position dimensioned to fit closely on the other column member and a second length extending from said first length towards its receiving end diverging to provide a clearance, the one column member is a tube and the other column member is a rod, and bearing means supporting the members for rotation about their longitudinal axis and for limited tilting of said axis.

4. An assembly according to claim 3, in which the bearing means comprises a bracket adapted to be secured to a vehicle body and providing a part-spherical seat encompassing the one column member, and a part-spherical body of plastics material secured to the one column member and received in the seat.

5. An assembly according to claim 3, in which the portion of the other column member which lies, in said operative position, within said first length is coated with a low friction material.

6. An assembly according to claim 3, in which the column members are of non-circular cross section.

7. An assembly according to claim 6, in which the column members are of generally square cross section.

* * * * *